(12) United States Patent
Foucault et al.

(10) Patent No.: US 6,174,575 B1
(45) Date of Patent: *Jan. 16, 2001

(54) UNIVERSAL PLUG FOR A COUNTERBALANCING MECHANISM

(75) Inventors: Pierre-Louis Foucault, St-Lambert; Michel Beaudoin, Drummondville, both of (CA)

(73) Assignee: Canimex Inc., Drummondville (CA)

( * ) Notice: Under 35 U.S.C. 154(b), the term of this patent shall be extended for 0 days.

This patent is subject to a terminal disclaimer.

(21) Appl. No.: 09/010,960

(22) Filed: Jan. 22, 1998

Related U.S. Application Data

(63) Continuation-in-part of application No. 08/705,117, filed on Aug. 29, 1996, now abandoned.

(30) Foreign Application Priority Data

May 14, 1997 (CA) ................................................. 2206547

(51) Int. Cl.[7] .......................... B29D 23/00; B65D 43/26
(52) U.S. Cl. ........................ 428/34.1; 428/36.9; 220/284; 16/DIG. 7
(58) Field of Search ................................ 428/35.7, 34.1, 428/36.9; 242/375; 267/155; 220/4.21, 284; 160/191, 201; 49/200; 16/DIG. 1, DIG. 7

(56) References Cited

U.S. PATENT DOCUMENTS

| | | | |
|---|---|---|---|
| 312,241 | 2/1885 | Farmer | 464/57 |
| 1,288,799 * | 12/1918 | Ayres et al. | 220/4.21 |
| 1,792,622 * | 2/1931 | Wikstrom | 220/284 |
| 2,257,484 * | 9/1941 | Rowe | 16/198 |
| 2,303,002 * | 11/1942 | Ruddock | 242/375 |
| 2,340,300 | 2/1944 | Booth et al. | 287/117 |
| 2,413,786 * | 1/1947 | Ruddock | 254/364 |
| 2,630,597 * | 3/1953 | Robinson | 267/155 |
| 2,660,753 * | 12/1953 | Moler | 160/191 |
| 2,749,570 | 6/1956 | Alder | 16/198 |
| 2,774,507 * | 12/1956 | Hurley | 220/284 |
| 2,960,851 | 11/1960 | Ciaccio | 64/6 |
| 3,038,535 | 6/1962 | Stroup et al. | 160/191 |
| 3,370,599 | 2/1968 | Ciaccio | 134/167 |
| 3,685,567 | 8/1972 | Pemberton et al. | 160/8 |
| 3,779,537 | 12/1973 | Kalister | 267/179 |
| 4,042,305 | 8/1977 | Vincent | 403/14 |
| 4,078,880 * | 3/1978 | Hunziker | 431/76 |
| 4,165,018 * | 8/1979 | Giggard | 220/284 |
| 4,278,836 | 7/1981 | Bingham | 174/84 |
| 4,519,556 | 5/1985 | Timoschuk | 242/117 |
| 4,673,100 * | 6/1987 | Reis et al. | 220/284 |
| 4,817,927 | 4/1989 | Martin | 267/155 |
| 4,852,378 | 8/1989 | Greco | 72/379 |
| 4,871,007 | 10/1989 | Abolins | 160/201 |
| 4,878,529 | 11/1989 | Hormann | 160/201 |
| 4,940,357 | 7/1990 | Davis | 403/344 |
| 5,103,890 | 4/1992 | Cloutier | 160/190 |
| 5,201,897 | 4/1993 | Whiting | 267/155 |
| 5,205,413 * | 4/1993 | Cautereels et al. | 220/4.21 |
| 5,275,223 | 1/1994 | Magro et al. | 160/191 |
| 5,419,010 | 5/1995 | Mullet | 16/198 |

* cited by examiner

*Primary Examiner*—Rena L. Dye
(74) *Attorney, Agent, or Firm*—Merchant & Gould P.C.

(57) ABSTRACT

The plug is for use with a torsion spring and is removably connectable to a component of a counterbalancing mechanism. The plug comprises a generally circular base and a hollow body coaxially projecting from the base. The body has an outer surface for receiving an end of the torsion spring. At least two spaced-apart connection flanges are axially projecting from the base and opposite to the body. Each flange comprises a pair of opposite side shoulders. The flanges are removably inserted into the component for connecting the plug thereto in interfering engagement. Plugs that are constructed accordingly create modular and versatile sub-assemblies with other components. Such plugs are then easily secured in place and do require an extensive inventory of parts to accommodate all situations.

7 Claims, 6 Drawing Sheets

UNIVERSAL PLUG FOR A COUNTERBALANCING MECHANISM

This is a Continuation-in-Part of U.S. patent application Ser. No. 08/705,117, filed Aug. 29, 1996 which is not abandoned.

BACKGROUND

Counterbalancing mechanisms have been employed for many years. Common examples of use for such systems are garage doors in homes, commercial and industrial buildings, or sliding truck doors. In some applications, they may be used with windows or other kinds of panels. Counterbalancing mechanisms provide a mechanical assistance for facilitating the opening and closing of these movable items. They allow a person to manipulate them easily and to use a smaller motor when powered assistance is provided.

The counterbalancing mechanisms that use torsion springs enjoy an increasing popularity in the industry. They generally comprise a pair of spaced-apart cable drums connected to flexible cables which, in turn, are connected to corresponding lower parts of the door, for instance. The cable drums are mounted around a shaft that is transversely located above the door opening. The torsion springs, coaxially located on the shaft, are each secured at one end to a corresponding cable drum. The other end of each torsion spring is secured to a fixed location, such as a bracket, itself rigidly attached to a wall or the ceiling. The torsion springs are biased to rotate in a direction which winds the cables onto the cable drums. The spring torque is adjusted to properly balance the weight of the door so that minimum opening and closing effort is required, either manually or motor controlled.

In use, each end of a torsion spring is connected to an adjacent component by means of a plug. The plug usually comprises a body having an outer surface with a plurality of grooves forming threads for receiving the corresponding end coils. The plugs are generally provided with superposed right-hand and left-hand threads, as disclosed in U.S. Pat. No. 3,779,537 of 1973 to Kalister. Each plug is connected to an adjacent component, such as a cable drum, a gear, a wall bracket or even the shaft, by means of fasteners. Examples of fasteners are screws, bolts or the like. One drawback of this situation is that the installation with fasteners is time consuming and tedious. Also, the use of fasteners is very difficult when securing a loaded spring to an adjacent component.

Alternatively, the plug may be molded or cast with the component to create a single integrated part. This creates the need of having inventories of many parts to accommodate all possible situations.

SUMMARY

According to the present invention, there is provided a universal plug that facilitates and simplifies the installation of counterbalancing mechanisms with torsion springs. It creates modular and versatile sub-assemblies that are easily installed and that do not require an extensive inventory of parts.

More particularly, it is an object of the present invention to provide a plug for use with a torsion spring and removably connectable to an adjacent component of a counterbalancing mechanism, the plug comprising:
 a generally circular base;
 a generally circular hollow body coaxially projecting from the base and having an outer surface for receiving an end of the torsion spring; and
 at least two spaced-apart connection flanges axially projecting from the base and opposite to the body, each flange comprising a pair of opposite side shoulders;
whereby, in use, the flanges are inserted into the component for connecting the plug thereto in an interfering engagement.

A non restrictive description of preferred embodiments will now be given with reference to the appended drawings.

IDENTIFICATION OF THE COMPONENTS

Figure 1:
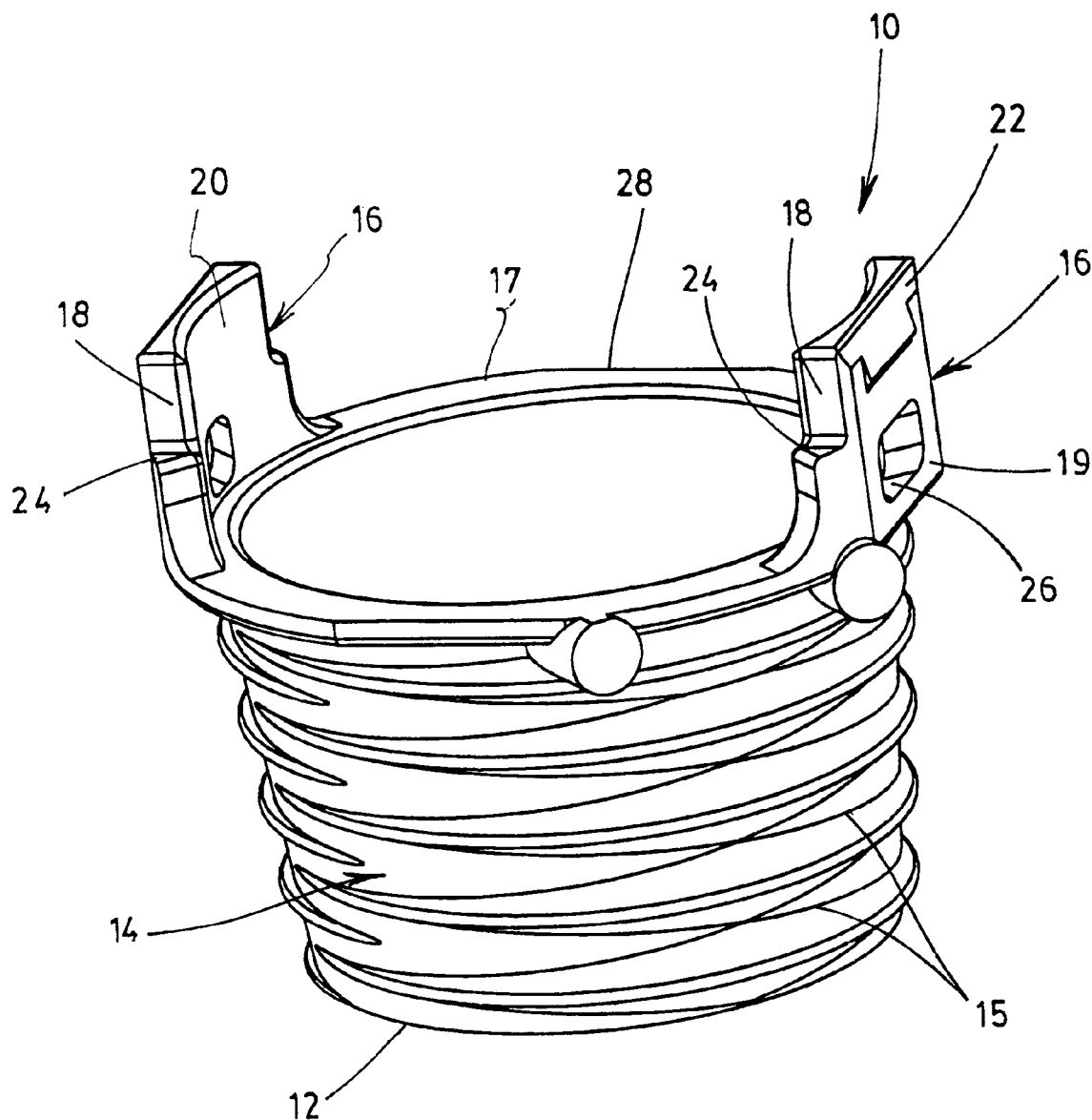
FIG. 1 is a side perspective view of a plug according to a possible embodiment of the present invention.

The following is a list of the reference numerals, along with the names of the corresponding components, that are used in the appended drawings and in the description of the preferred embodiments.

10 plug (torsion-spring plug)
 12 body
 14 outer surface
 15 threads
 16 flanges
 17 rim (base)
 18 circumferential sides (of the flanges)
 19 flat outer face (of the flanges)
 20 curved inner face (of the flanges)
 22 bevelled outer end portion (of the flanges)
 24 side shoulders (of the flanges)
 26 chamfered holes
 28 truncated sides (of the rim)
 30 cable drum
 32 rim (of the cable drum)
 34 web (of the cable drum)
 36 cable entry (of the cable drum)
 38 central opening (of the cable drum)
 40 tongues (of the cable drum)
 42 short members (of the cable drum)
 44 slots (of the cable drum)
 50 gear 52 teeth (of the gear)
54 central opening (of the gear)
56 blocks (of the gear)
58 flat surfaces (of the gear)
60 loading head
62 rim (of the loading head)
64 side openings (of the loading head)
66 central opening (of the loading head)
68 web (of the loading head)
70 slots (of the loading head)
72 housings (of the loading head)
80 bracket
81 base
82 flanged portion (of the wall bracket)
84 opening (of the wall bracket)
86 tongues (of the wall bracket)
88 locking bosses (of the tongues)
90 holes (of the wall bracket)

DESCRIPTION

FIG. 1 shows a plug (10) according to a possible embodiment of the present invention. The plug (10) comprises a hollow body (12) having a generally circular outer surface (14). The outer surface (14) is adapted to receive the last coils at one end of a torsion spring (not shown). The body (12) of the plug (10) shown in FIG. 1 is conical and the external surface is preferably provided with superposed right-hand and left-hand threads (15), as disclosed in U.S. Pat. No. 3,779,537 of 1973 to Kalister. Of course, other shapes are also possible, as apparent to a person skilled in the art. It should be noted that FIG. 1 shows two side protuberances due to the moulding in case of plastic parts. These are usually smaller in finish products than what is shown and are not present when the plug (10) is made of metal.

Figure 2:
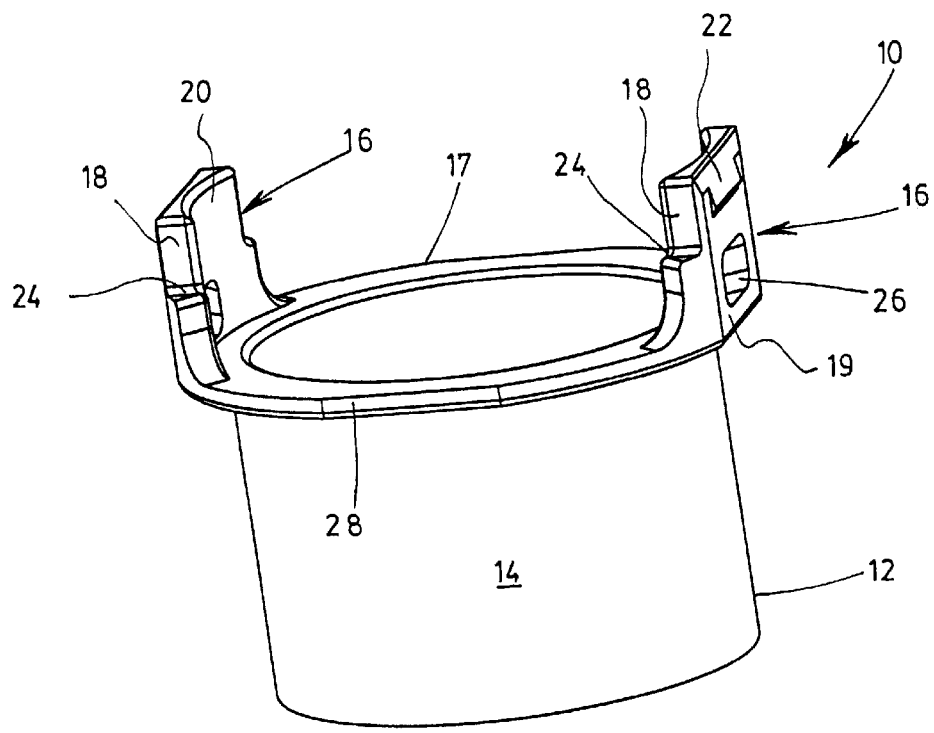
FIG. 2 is a side perspective view of a plug similar to the one of FIG. 1, wherein the base has a cylindrical body with a flat outer surface.
Figure 3:
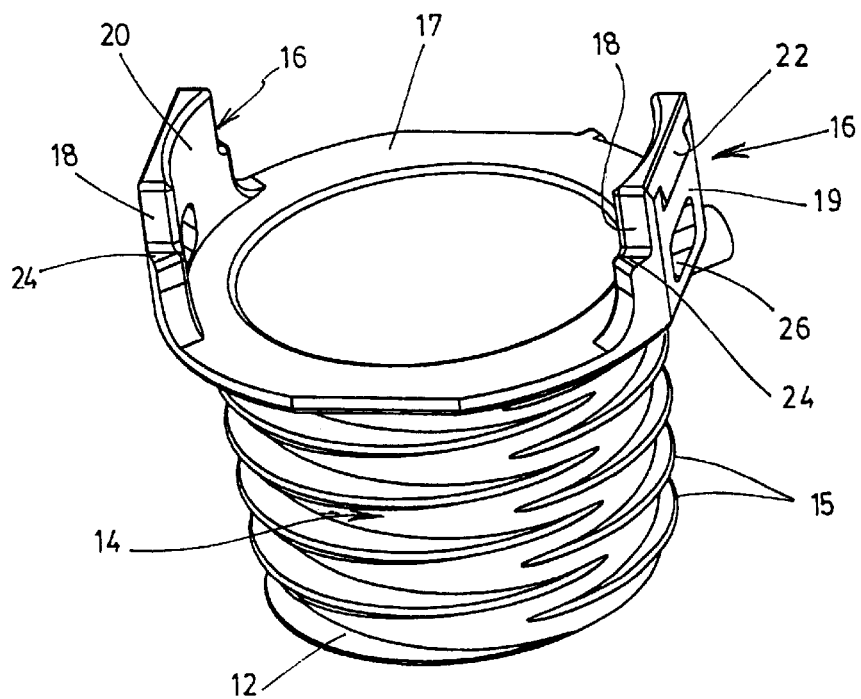
FIG. 3 is a side perspective view of a plug similar to the one of FIG. 1, wherein the base has protruding threads.

FIGS. 2 and 3 show similar plugs (10) but with slightly different bodies (12). In FIG. 2, the body (12) of the plug (10) is cylindrical and has a flat outer surface (14). It snugly fits inside the end of the torsion spring and a fastener, such as a pin (not shown), is used to secure it to the spring. In FIG. 3, the body (12) of the plug (10) has more protruding threads (15) compared to the ones shown in FIG. 1.

Preferably, each plug (10) comprises at least two spaced-apart connection flanges (16) axially projecting from the base of the plug (10) and opposite to the body (12). In the preferred embodiment, the base is a flat rim (17). However, the base may only be the junction between the body (12) and the flanges (16) without any large rim. In the case of a conical body, such as in FIGS. 1 and 3, the flanges (16) project from the end having the largest diameter.

Each flange (16) as circumferential sides (18) that are preferably aligned with the center of the plug (10). In use, the flanges (16) connect the plug (10) to the adjacent component of the counterbalancing mechanism. The flanges (16) then transmit the torque by their sides (18). These sides (18) are preferably inserted by force inside a receiving portion of the adjacent component and locked in position by interfering engagement. The depth of insertion is delimited by a pair of side shoulders (24) located right under the sides (18) of the flanges (16). Alternatively, the plug (10) may be locked in position with the component by means of a radial hole (26) extending from side-to-side of a corresponding flange (16). The outer portion of the hole (26) may be chamfered to facilitate the use of a locking boss, as it will be explained later.

Each flange (16) preferably comprises a flat outer face (19) and a curved inner face (20). The curved inner faces (20) are suitable for receiving a bearing (not shown) in interfering engagement. In use, the bearing may then hold both the plug (10) and the adjacent component.

The interfering engagement for the flanges (16) with an adjacent component may be realized by the sides (18), the outer faces (19) or both at the same time. Preferably, each outer face (19), near the free end of the corresponding flange (16), comprises a bevelled outer end portion (22) to facilitate the insertion of the flange (16), especially when the engagement is with an interference.

Referring now to FIGS. 4 to 11, there are shown various kinds of components that may be used in conjunction with the plug (10). Other kinds of components are also possible as well. Since the plug (10) may be used in combination with any of the components, the design and the installation of the counterbalancing mechanism is very easy because the plug (10) may be readily and rapidly connected in place. Various examples of components will now be explained.

Figure 4:
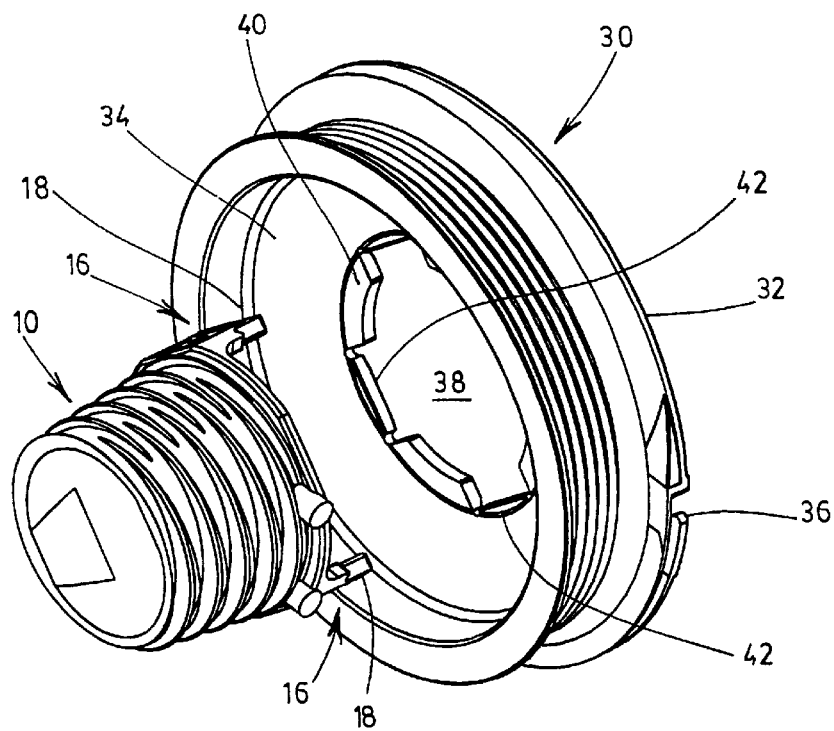
FIG. 4 is an exploded perspective view of a cable drum and the plug shown in FIG. 1.
Figure 5:
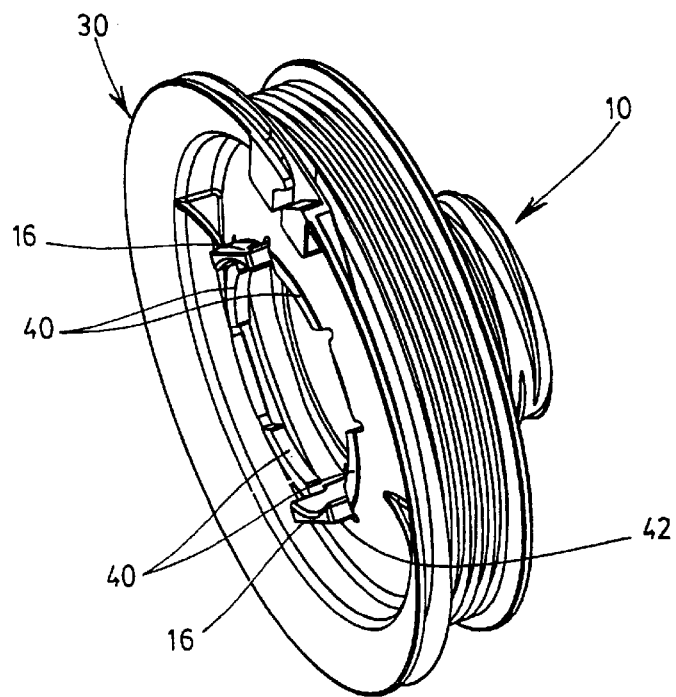
FIG. 5 is a rear perspective view of the plug and the cable drum shown in FIG. 5, once connected together.

FIGS. 4 and 5 show a first example of a component to be connected to the plug (10), namely a cable drum (30). The cable drum (30) is adapted to receive a cable (not shown) that winds on a cylindrical rim (32), inside which is located a solid portion called a web (34). The web (34) is preferably hemispherical. One free end of the cable is secured to a cable entry (36) formed on the side of the rim (32). The web (34) has a central opening (38) comprising substantially radial tongues (40) spaced apart from each other and projecting inwardly from an edge thereof. These tongues (40) are designed to accommodate the flanges (16). In the illustrated embodiment, there are four tongues (40) corresponding to two flanges (16). The inner edges of the tongues (40) receive the sides (18) of the flanges (16) in an interfering engagement, thereby preventing a relative rotational movement. At that point, the side shoulders (24) of the plug (10) are resting over the tongues (40). Also, short members (42), each having a flat inner surface, are provided between each tongue (40). Each short member (42) is designed to press against the outer side (19) of a flange (16) to achieve an additional interfering engagement. A small slot (44) is provided between each tongue (40) to avoid sharp corners and to add flexibility to the tongues (40).

Figure 6:
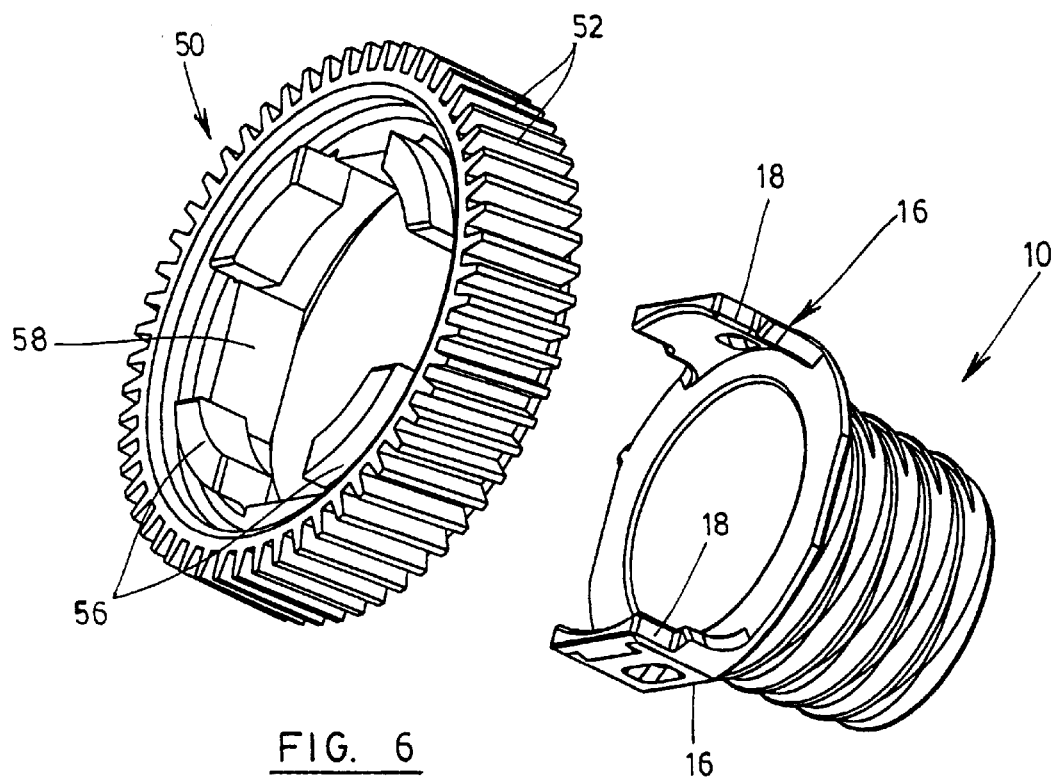
FIG. 6 is an exploded perspective view of a gear and the plug shown in FIG. 1.
Figure 7:
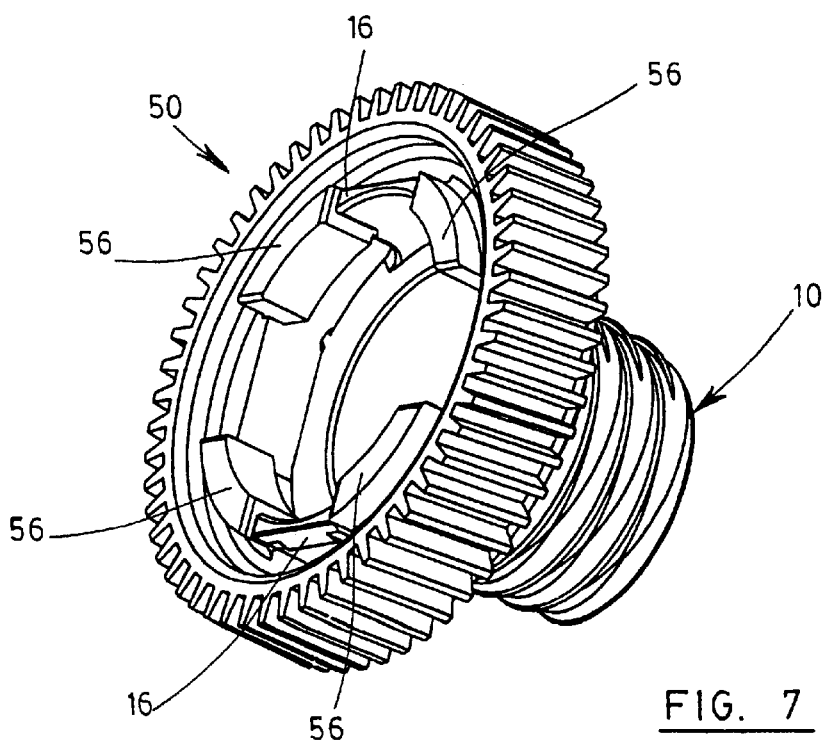
FIG. 7 is a perspective view of the plug and the gear shown in FIG. 6, once connected together.

FIGS. 6 and 7 show a second example of a component to be connected to the plug (10), namely a gear (50). The gear (50) may be used, for example, in the mechanical connection to a motor (not shown) or to a pre-loading device (not shown). The gear (50) comprises a plurality of teeth (52) and a central opening (54) around which are located spaced-apart blocks (56) radially projecting towards the center of the gear (50). The blocks (56) are separated by intermediary flat surfaces (58) that are preferably slightly offset with respect to the radial plane. The blocks (56) are adapted to receive the sides (18) of the flanges (16) in an interfering engagement. The flat surfaces (58), for their part, are adapted to receive the flat faces (19) of the flanges (16), also in an interfering engagement. FIG. 7 shows the resulting assembly when the gear (50) and the plug (10) are connected together.

Figure 8:
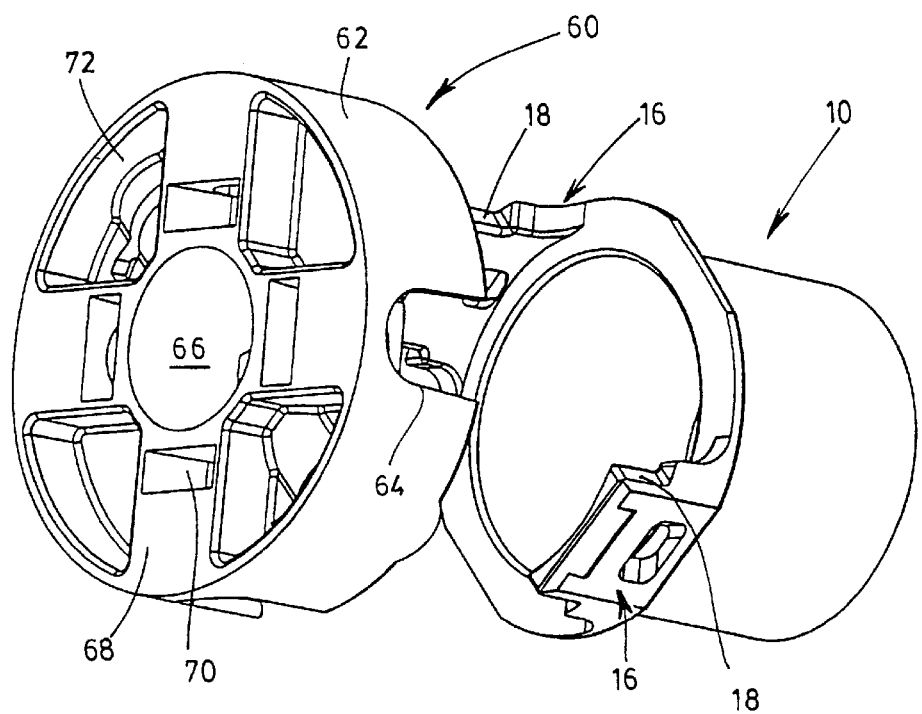
FIG. 8 is an exploded perspective view of a loading head and the plug shown in FIG. 2.
Figure 9:
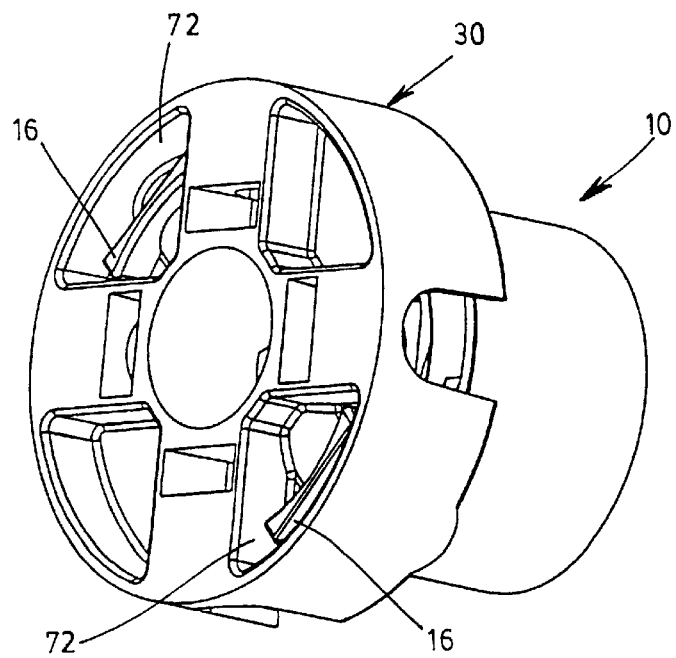
FIG. 9 is a perspective view of the plug and the gear shown in FIG. 8, once connected together.

FIGS. 8 and 9 show a third example of a component to be connected to the plug (10), namely a loading head (60). The loading head (60) is used as a strong point for an elongated tool bar (not shown) operated by the installer for loading the spring. The head (60) comprises a rim (62) with a plurality of spaced-apart side openings (64) through which the end of the tool bar may be inserted. A central opening (66) allows the head (60) to be inserted around the supporting shaft (not shown). The head (60) further comprises a web (68), itself provided with axially extending slots (70). The rim (62) and the web (68) of the head (60) define housings (72) in which the flanges (16) are interferingly engaged therein, similar to the gear (50). Once the proper tension is read in the spring, the head (60) is secured to the shaft by means of bolts (not shown) pressing on flat sections of the shaft.

Figure 10:
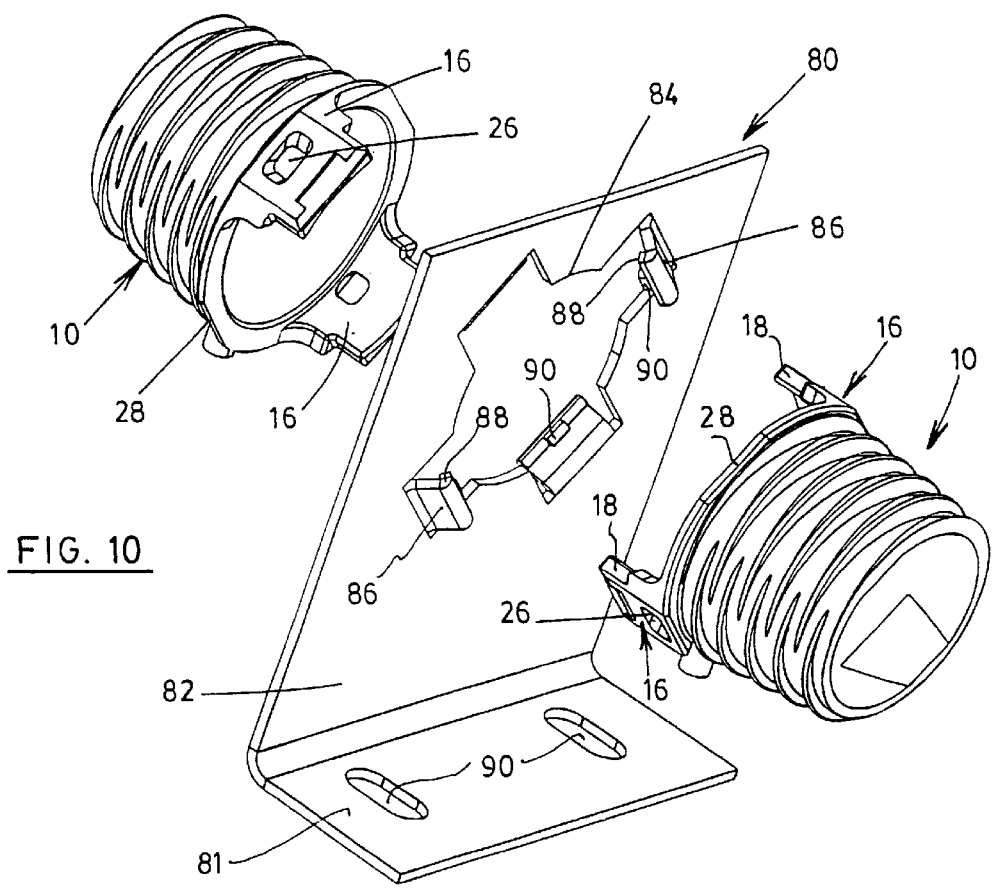
FIG. 10 is an exploded perspective view of a wall bracket and two end-to-end plugs such as the one shown in FIG. 1.
Figure 11:
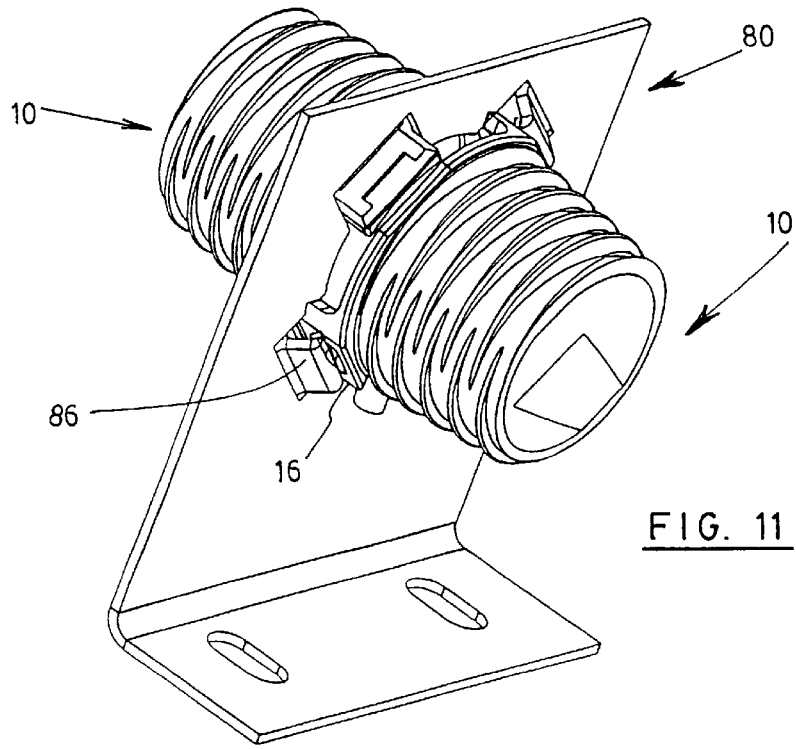
FIG. 11 is a perspective view of the plugs and the wall bracket shown in FIG. 10, once connected together.

FIGS. 10 and 11 show a fourth example of a component to be connected to the plug (10), namely a bracket (80). The bracket (80) is used to secure one end of the springs to a fixed location, such as a wall, a stud, the ceiling, etc. It is preferably made of an L-shaped metal part comprising a base (81) and a flanged portion (82). The base (81) of the bracket (80) comprises holes (90), preferably oblong, in which fasteners. (not shown) may be inserted to secure the bracket (80) to the fixed location. The flange portion (82) has an opening (84), preferably generally X-shaped and provided with pairs of opposite and oblique tongues (86). The tongues (86) of a same pair project towards one side of the flanged portion (82) while the tongues (86) of the other pair project to the opposite side. Each tongue (86) has a rectangular locking boss (88) located in the inner side thereof. The bosses (88) are adapted to fit into the corresponding hole (26) provided on a corresponding flange (16). The purpose of the bosses (88) is to lock the plug (10) in place and in addition to the interfering engagement.

In the embodiment shown in FIGS. 10 and 11, two end-to-end plugs (10) may be assembled with the bracket (80). One is rotated 90° with reference to the other. This allows the use of a single bracket (80) in the middle of the counterbalancing mechanism. Again, the sides (18) of the flanges (16) are used to lock the plug (10) in rotation. Depending on the design, the rim (17) of the plug or plugs (10) may have opposite truncated sides (28) to accommodate the flanges (16) of an opposite plug (10), as shown in FIG. 11.

Although preferred embodiments of the invention have been described in detail herein and illustrated in the accompanying drawings, it is to be understood that the invention is not limited to these precise embodiments and that various changes and modifications may be effected therein without departing from the scope or spirit of the invention.

What is claimed is:

1. A plug for use with a torsion spring and removably connectable to an adjacent component of a counterbalancing mechanism, the plug comprising:

a generally circular base;

a generally circular hollow body coaxially projecting from the base and having an outer surface configured to receive an end of the torsion spring; and at least two spaced-apart connection flanges axially projecting from the base and opposite the body;

whereby, in use, the flanges are inserted into the component for connecting the plug thereto.

2. A plug according to claim 1, wherein each of the flanges further comprises a radial hole provided on an outer surface thereof.

3. A plug according to claim 1, wherein each of the flanges further comprises a pair of opposite side shoulders.

4. A plug for use with a torsion spring and removably connectable to an adjacent component of a counterbalancing mechanism, the plug comprising:

a base;

a body projecting from and centered with the base, the body having an outer surface configured to receive an end of the torsion spring; and at least two spaced-apart connection flanges projecting from the base and opposite the body;

whereby, in use, the flanges are inserted into the component for connecting the plug thereto.

5. A plug according to claim 4, wherein the outer surface of the body has generally circular cross section.

6. A plug according to claim 4, wherein each of the flanges further comprises a radial hole provided on an outer surface thereof.

7. A plug according to claim 4, wherein each of the flanges further comprises a pair of opposite side shoulders.

* * * * *